(No Model.) 2 Sheets—Sheet 1.
H. P. EILERS.
CUSHIONED CLUTCH.
No. 505,037. Patented Sept. 12, 1893.
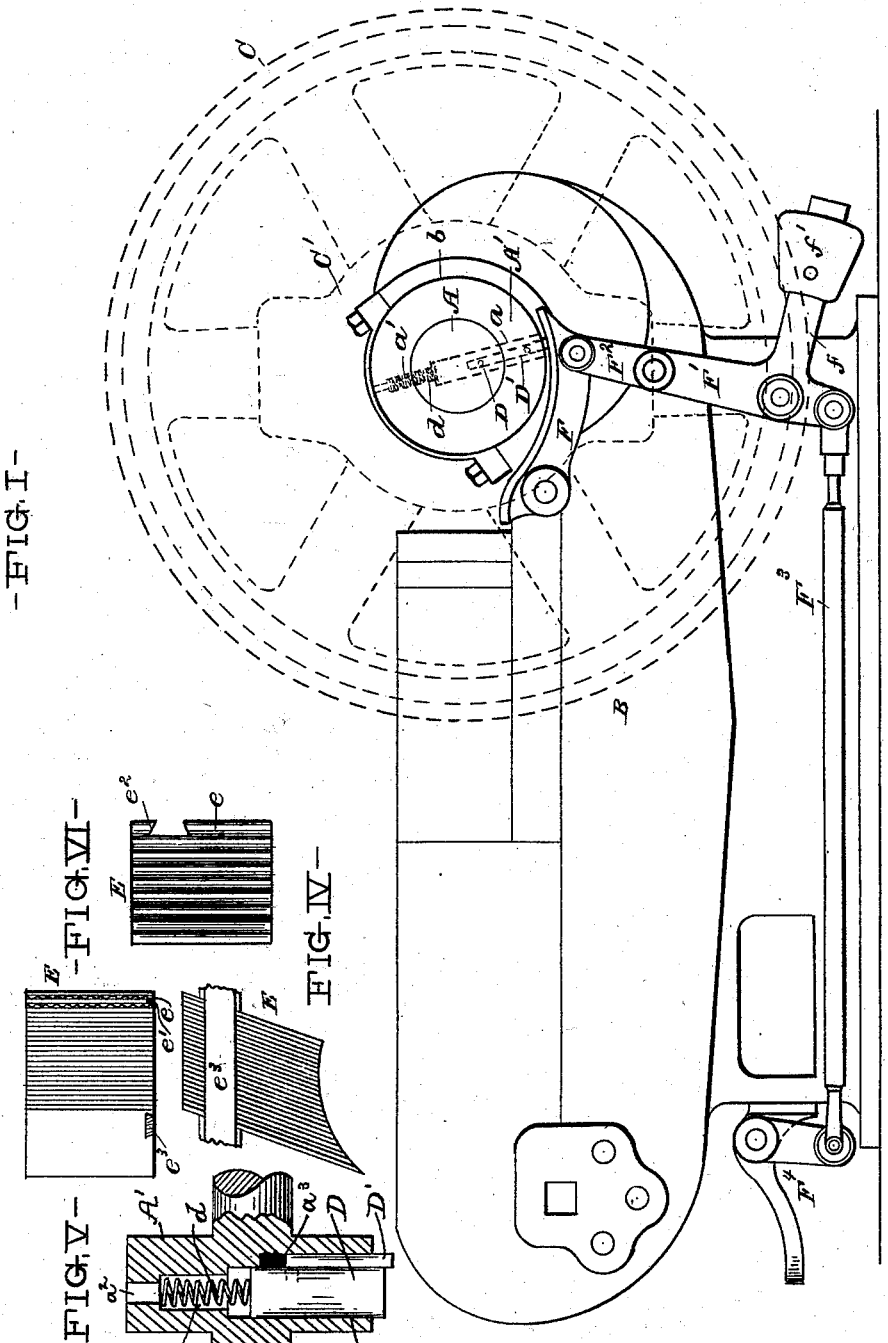
WITNESSES:
INVENTOR.

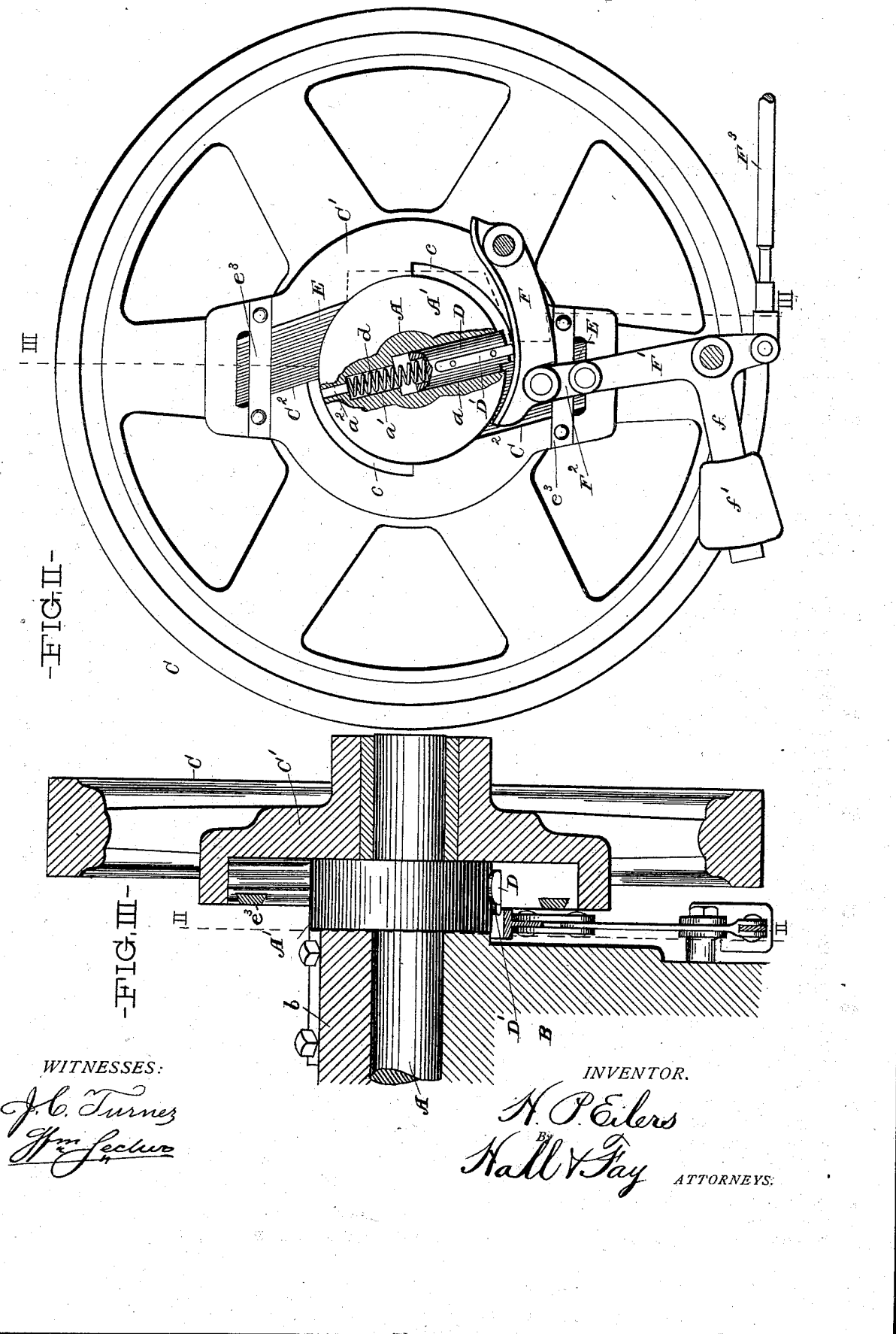

UNITED STATES PATENT OFFICE.

HIO P. EILERS, OF CLEVELAND, OHIO.

CUSHIONED CLUTCH.

SPECIFICATION forming part of Letters Patent No. 505,037, dated September 12, 1893.

Application filed April 15, 1893. Serial No. 470,459. (No model.)

*To all whom it may concern:*

Be it known that I, HIO PETER EILERS, a citizen of the United States, and a resident of Cleveland, county of Cuyahoga, and State of Ohio, have invented certain new and useful Improvements in Cushioned-Clutch Devices, of which the following is a specification, the principle of the invention being herein explained and the best mode in which I have contemplated applying that principle, so as to distinguish it from other inventions.

The annexed drawings and the following description are set forth in detail, one mechanical form embodying the invention; such detail construction being but one of various mechanical forms in which the principle of the invention may be used.

In said annexed drawings—Figure I represents a side elevation of as much of a bolt heading machine as is necessary to illustrate my improvement, the pulley being shown in dotted lines, and the shaft and clutch operating mechanism being shown in full lines; Fig. II, a section on the line II—II, Fig. III, illustrating the pulley and part of the clutch operating mechanism in side elevation, and a part of the clutch disk broken away and removed; Fig. III, a section on the line III—III, Fig. II, looking in the direction of the arrow in said figure; Figs. IV, V and VI, respectively a side view of the cushion block of the clutch, an end view of said block, and a view of one of the corrugated plates in the same, and Fig. VII, a diametrical section of the disk and bolt of the clutch.

My improved clutch device is illustrated in the drawings as applied to a bolt heading machine,—the frame of such machine being outlined in the drawings,—but it is obvious that the clutch device may be applied to any machine or mechanism where it is desired to intermittently communicate motion between a pulley or wheel and a shaft for such pulley or wheel.

The shaft A, to which intermittent movement is to be communicated, is journaled in suitable bearings, $b$, in the machine frame B, and has the loose pulley C, fitted to revolve upon its end, outside the bearing. The shaft is formed with an enlargement or collar, A′, formed with a diametrical bore consisting of a larger portion, $a$, extending from the periphery of the collar to beyond the center of the same; a smaller portion, $a'$, and a still smaller portion, $a^2$. A groove, $a^3$, is formed in one side of the larger bore portion $a$, and extends the length of the same. A bolt, D, slides in said larger bore portion and has a key, D′, secured to its side, which key slides in the groove of the bore portion and prevents the bolt from turning in the bore. A spring, $d$, fits in the smaller portion $a'$ of the bore and bears against the bolt, forcing the latter outward. The loose pulley C has an enlarged hub portion, C′, which fits over the collar A′, and the central opening of this hub portion has opposite segmental recesses, $c$, into either one of which the end of the bolt D may project. Recesses, $C^2$, are formed in the hub portion of the pulley, at one end of each segmental recess, and said recesses $C^2$ are formed at a slight angle to the radii at such points of the hub portion. Cushions, E, are secured in said recesses, and are composed of plates of spring metal,—longitudinally corrugated plates, $e$, preferably alternating with flat plates, $e'$. The ends of the plates bear against the collar, and the bolt may engage the inclined side of the laminated cushion at the end of whichever segmental recess it may project into. The outside edges of the plates constituting the cushions, are formed with dovetailed notches, $e^2$, into each of which a correspondingly shaped bar, $e^3$, may fit; said bar being secured at its ends to the sides of the recess for the cushion, and serving to hold the plates of the latter together and to hold the cushion in place in its recess.

A curved shoe, F, is pivoted at one end to the machine frame, between the latter and the pulley, in such a manner that it may engage the outer end of the key upon the stop bolt D and force the latter inward, when raised against it at its free end. A lever, F′, is pivoted beneath said shoe, upon the machine frame, and is pivotally connected, at its upper end, to the free end of said shoe, by means of a link, $F^2$. A connecting rod, $F^3$, is pivotally connected at one end to the lower arm of said lever, and is pivotally connected at the other end to a bell-crank foot lever, $F^4$, by means of which foot lever and rod the toggle device F′ $F^2$ may be straightened or bent;

and the shoe raised or lowered. An arm, $f$, projects from the fulcrum point of the lever F' or lower member of the toggle device, and a weight, $f'$, is secured upon said arm to normally hold the toggle device straightened.

In practice, power is applied to revolve the pulley, and whenever it is desired to communicate the rotary motion of the pulley to the shaft, the foot lever is depressed, which pushes the connecting rod toward the end of the machine, in which the shaft is journaled. This rocks the lower toggle member so as to bend the toggle device, and lower the shoe, when the stop bolt in the shaft may slide outward and be engaged by one of the spring cushions in the pulley, which will cause the shaft to be revolved with the pulley. The shock of the cushion striking the bolt, will be taken up by the elasticity of the cushion, so that there will be no sudden jar to the mechanism actuated by the shaft. In a like manner the cushion will take up any shock communicated to the shaft, without communicating the shock to the pulley or to the power source driving the same. As soon as the foot lever is released, the toggle device will be straightened by the weight, and the shoe will press the bolt inward, disconnecting the clutch.

Other modes of applying the principle of my invention may be employed for the mode herein explained. Change may therefore be made as regards the mechanism thus disclosed, provided the principles of construction set forth respectively in the following claims are employed.

I therefore particularly point out and distinctly claim as my invention—

1. The combination of a shaft, a loose pulley upon said shaft, a stop movable to project from the surface of said shaft and to be withdrawn into the same, a cushion in the hub of said pulley to be engaged by said stop, and means for projecting and withdrawing the stop, substantially as set forth.

2. The combination of a shaft, a loose pulley upon said shaft, a stop in said shaft having means for projecting it from the surface of the same and withdrawing it into the same, and a cushion in the hub of the pulley to be engaged by said stop, and composed of plates of spring metal, substantially as set forth.

3. In a clutch device of the described form, a cushion composed of plates of spring metal having interposed, corrugated plates of spring metal, substantially as set forth.

4. In a clutch device of the described form, a cushion composed of alternating flat and corrugated spring metal plates, substantially as set forth.

5. The combination of a shaft, a loose pulley upon said shaft, a stop in said shaft having means for projecting it from the surface of the same and withdrawing it into the same, and a cushion in the hub of the pulley to be engaged by the stop,—said cushion composed of spring metal plates having corrugated spring metal plates interposed between them, substantially as set forth.

6. The combination of a shaft, a stop constructed to project from the periphery of said shaft, a loose pulley upon the shaft, and a cushion in the hub of said pulley to be engaged by said stop, substantially as set forth.

7. The combination of a shaft, a stop constructed to project from the periphery of said shaft, a loose pulley upon the shaft and having a shoulder in its hub engaged by said stop, and a shoe provided with means for forcing it toward and from the shaft and arranged in the path of a portion of said stop,—said shoe thus serving to force back or release the stop, substantially as set forth.

8. The combination of a shaft, a stop constructed to project from the periphery of said shaft and having a key upon its side, a loose pulley upon the shaft and having a shoulder in its hub to be engaged by the stop, and a shoe provided with means for forcing it toward and from the shaft and arranged in the path of the key upon the top, substantially as set forth.

9. The combination of a shaft formed with a collar having a diametrical bore, a spring-pressed bolt in said bore provided with a key upon its side, a loose pulley upon the shaft having a hub portion embracing the collar and formed with segmental recesses around said collar and with deeper recesses at the ends of the segmental recesses, laminated spring cushions in said deeper recesses, and a shoe having means for forcing it toward and from the shaft and arranged in the path of the key upon the bolt, substantially as set forth.

In testimony that I claim the foregoing to be my invention I have hereunto set my hand this 13th day of April, A. D. 1893.

HIO P. EILERS.

Witnesses:
   J. B. FAY,
   WM. SECTUR.